(12) United States Patent
Nakagawa

(10) Patent No.: US 7,449,761 B2
(45) Date of Patent: Nov. 11, 2008

(54) ELECTRO-OPTICAL DEVICE, METHOD FOR MANUFACTURING ELECTRO-OPTICAL DEVICE, AND ELECTRONIC APPARATUS

(75) Inventor: Masashi Nakagawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 135 days.

(21) Appl. No.: 11/653,508

(22) Filed: Jan. 16, 2007

(65) Prior Publication Data
US 2007/0170430 A1 Jul. 26, 2007

(30) Foreign Application Priority Data
Jan. 24, 2006 (JP) .............................. 2006-015362

(51) Int. Cl.
*H01L 29/78* (2006.01)

(52) U.S. Cl. ...................................... 257/437; 257/436

(58) Field of Classification Search ................. 257/436, 257/437
See application file for complete search history.

(56) References Cited

U.S. PATENT DOCUMENTS 5,757,054 A * 5/1998 Miyawaki et al. ............ 257/390
6,610,997 B2 * 8/2003 Murade ........................ 257/72

FOREIGN PATENT DOCUMENTS

JP 2003-140566 A 5/2003

\* cited by examiner

*Primary Examiner*—Douglas M Menz
(74) *Attorney, Agent, or Firm*—Advantage Law Group, LLC

(57) ABSTRACT

An electro-optical device includes an anti-reflective layer arranged on the face of a first metal layer that is closer to a semiconductor layer than a second metal layer. The anti-reflective layer covers the channel region as viewed in plan view.

9 Claims, 6 Drawing Sheets

ELECTRO-OPTICAL DEVICE, METHOD FOR MANUFACTURING ELECTRO-OPTICAL DEVICE, AND ELECTRONIC APPARATUS

BACKGROUND

1. Technical Field

The present invention relates an electro-optical device, a method for manufacturing such an electro-optical device, and an electronic apparatus.

2. Related Art

In general, electro-optical devices, for example, liquid crystal devices for displaying images using electro-optical materials such as liquid crystals, each include a pair of substrates and a liquid crystal sandwiched therebetween. An electro-optical device such as an active matrix-type liquid crystal device driven by thin-film transistors (TFTs) or thin-film diodes (TFDs) includes pixel electrodes and switching elements that are arranged above an element substrate (active matrix substrate) so as to correspond to intersections of many scanning lines (gate lines) and data lines (source lines) extending lengthwise or crosswise.

The switching elements such as TFTs are turned on by on-signals applied to the scanning lines, so that image signals transmitted through the data lines are written on the pixel electrodes, which are transparent and are made of indium tin oxide (ITO). Voltages corresponding to the image signals are thereby applied to a liquid crystal layer sandwiched between a counter electrode and the pixel electrodes, whereby the alignment of liquid crystal molecules is varied. That is, the transmittance of pixels is varied such that light beams passing through the pixel electrodes and the liquid crystal layer are varied depending on the image signals, whereby an image is displayed.

The element substrate, on which the switching elements are arranged, is prepared by depositing a semiconductor thin-film, insulating thin-film, or conductive thin-film having a predetermined pattern on a glass or quartz plate.

Properties of the TFTs are varied by the effect of light. If channel regions of the TFTs are irradiated with light, photo-leakage currents are caused, whereby the TFT properties are deteriorated. This causes a nonuniform image, a reduction in contrast, and deteriorations in flicker properties.

In order to shield the channel regions of the TFTs or regions adjacent to the channel regions from light, the element substrate or a counter substrate has a light-shielding film for blocking light. Incident light rays are scattered or multiply reflected by wires or leads and then applied to the TFTs. Japanese Unexamined Patent Application Publication No. 2003-140566 (hereinafter referred to as Patent Document 1) discloses an electro-optical device in which a light-shielding film is placed close to channel regions of TFTs such that these channel regions are securely shielded from light.

In the electro-optical device disclosed in Patent Document 1, an interlayer insulating layer overlying gates has a groove extending to an etching stopper layer covering the gates and the light-shielding film is placed in the groove such that the light-shielding film is located close to the channel regions.

However, the electro-optical device disclosed in Patent Document 1 has a problem in that these channel regions cannot be securely shielded from light if incident light is scattered or multiply reflected repeatedly.

SUMMARY

An advantage of an aspect of the present invention is to provide an electro-optical device in which the leakage of light is prevented in such a manner that anti-reflective layers are formed under metal layers located close to semiconductor layers having channel regions and therefore the channel regions are securely shielded from light. An advantage of another aspect of the present invention is to provide a method for manufacturing such an electro-optical device. An advantage of another aspect of the present invention is to provide an electronic apparatus.

A first aspect of the present invention provides an electro-optical device including switching transistor arranged to correspond to intersections of scanning lines and data lines. The electro-optical device further includes semiconductor layers, included in the transistors, lying above a substrate; metal layers, arranged on layers other than the semiconductor layers, each including one or more sublayers; and anti-reflective layers, arranged on faces of first metal sublayers which are included in the metal layers and which are most close to the semiconductor layers, covering channel regions included in the semiconductor layers when viewed from above, the faces being opposed to the semiconductor layers.

According to this configuration, reflected light rays can be prevented from reaching the channel regions of the semiconductor layers. Since the channel regions are shielded from light, the transistors can be prevented from malfunctioning and the leakage of light can be prevented.

In the electro-optical device, the first metal sublayers are preferably more close to a light-incident face of the substrate than the semiconductor layers.

According to this configuration, if light rays passing through a substrate are reflected by the first metal sublayers, the anti-reflective layers prevents the reflected light rays from reaching the semiconductor layers.

In the electro-optical device, the first metal sublayers are preferably more close to a face of the substrate that is opposite to the light-incident face than the semiconductor layers.

According to this configuration, if light rays passing through a substrate are incident on the first metal sublayers, the anti-reflective layers prevents the incident light rays from reaching the semiconductor layers.

The electro-optical device preferably further includes storage capacitors, arranged above the first metal sublayers, holding the voltages of pixel electrodes arranged to correspond to the intersections of the scanning and data lines. In the electro-optical device, the storage capacitors preferably include second metal layers, third metal layers, and dielectric layers disposed therebetween and the first metal sublayers preferably lie above the semiconductor layers and are preferably included in the data lines.

According to this configuration, since the first metal sublayers are located close to the semiconductor layers, light rays passing through a substrate are prevented by the first metal sublayers from reaching the semiconductor layers. The light rays that pass through this substrate and then reflected are prevented by the anti-reflective layers from reaching the semiconductor layers.

The electro-optical device preferably further includes capacitors, arranged above the first metal sublayers, holding the voltages of pixel electrodes arranged to correspond to the intersections of the scanning and data lines. In the electro-optical device, the first metal sublayers preferably lie above the semiconductor layers and are preferably included in the data lines.

According to this configuration, light rays passing through a substrate are prevented by the first metal sublayers from reaching the semiconductor layers. The light rays that pass through this substrate and then reflected are prevented by the anti-reflective layers from reaching the semiconductor layers.

In the electro-optical device, the first metal sublayers preferably have recessed sections, opposed to the semiconductor layers, having a depth less than that of other sections and the anti-reflective layers preferably lie on the recessed sections.

According to this configuration, since the distance between the semiconductor layers and the first metal sublayers is small, reflected light rays are hardly incident on the first metal sublayers and therefore are hardly incident on the semiconductor layers.

In the electro-optical device, the anti-reflective layers preferably entirely cover the semiconductor layers when viewed from above.

According to this configuration, the anti-reflective layers prevents light rays from reaching the semiconductor layers and therefore the transistors can be prevented from malfunctioning.

In the electro-optical device, the anti-reflective layers preferably extend over regions other than contact holes for electrically connecting the semiconductor layers to the metal layers.

According to this configuration, the anti-reflective layers do not extend in the contact holes and therefore are prevented from causing contact failures.

The electro-optical device preferably further includes insulating layers lying between the anti-reflective layers and the first metal sublayers.

A second aspect of the present invention provides a method for manufacturing an electro-optical device including switching transistor arranged to correspond to intersections of scanning lines and data lines. The method includes forming semiconductor layers for forming the transistors on a substrate; forming interlayer insulating layer on the semiconductor layers; forming anti-reflective layers on regions of the interlayer insulating layers such that the anti-reflective layers cover channel regions included in the semiconductor layers when viewed from above, the regions of the interlayer insulating layers being opposed to the semiconductor layers; and forming first metal layers over the interlayer insulating layers and the anti-reflective layers.

According to this configuration, since the anti-reflective layers are located on faces of the first metal sublayers that are opposed to the transistors, light rays reflected by the first metal sublayers are prevented from reaching the semiconductor layers, thereby preventing the transistors from malfunctioning.

A third aspect of the present invention provides an electronic apparatus including the above electro-optical device.

In the electronic apparatus, malfunctions of the transistors or light leakage can be prevented. This allows a high-quality image to be displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the present invention will now be described in detail with reference to the accompanying drawings.

First Embodiment

Figure 1:
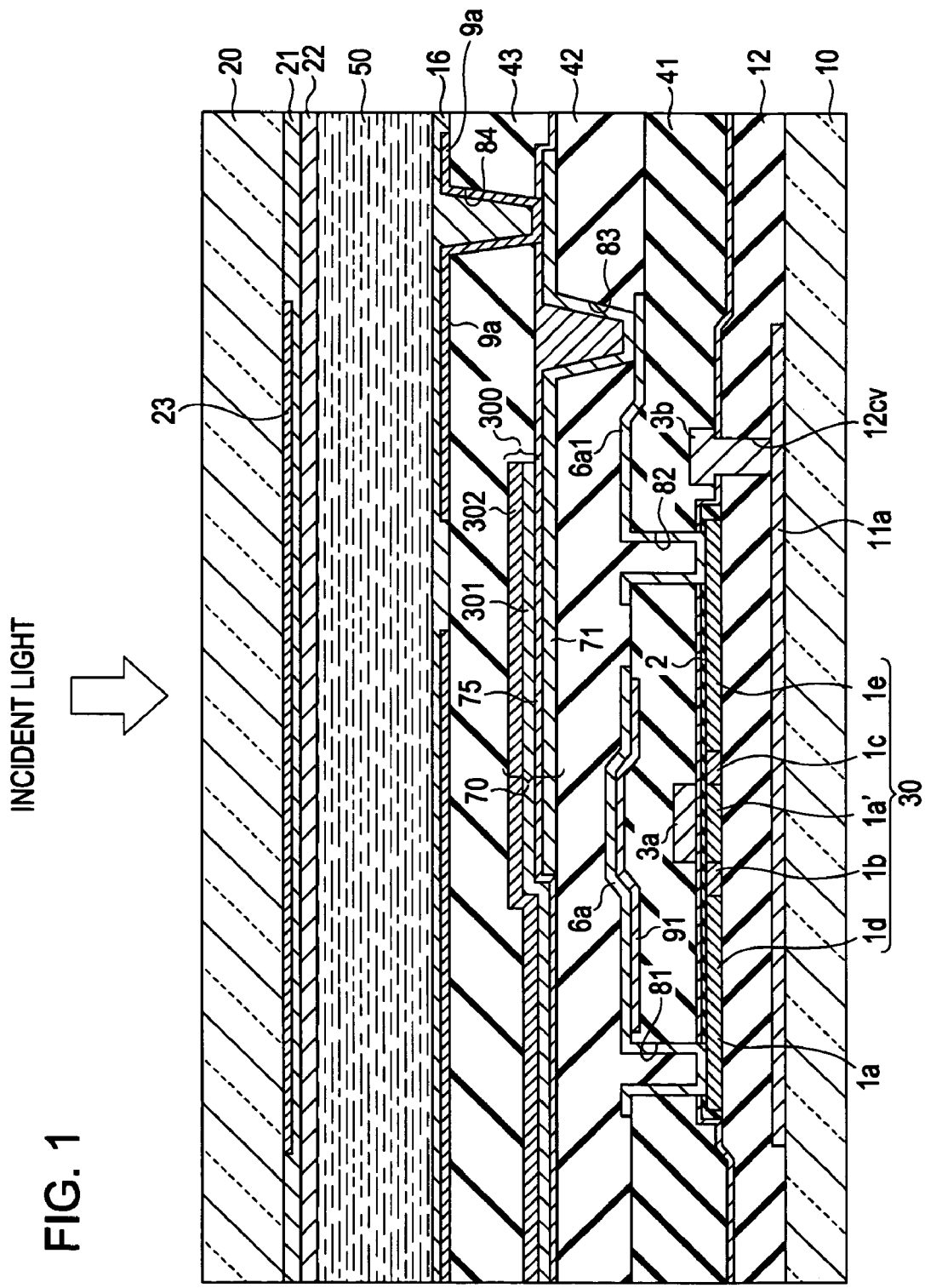
FIG. 1 is a sectional view showing the configuration of a pixel included in an electro-optical device according to a first embodiment of the present invention.
Figure 2:
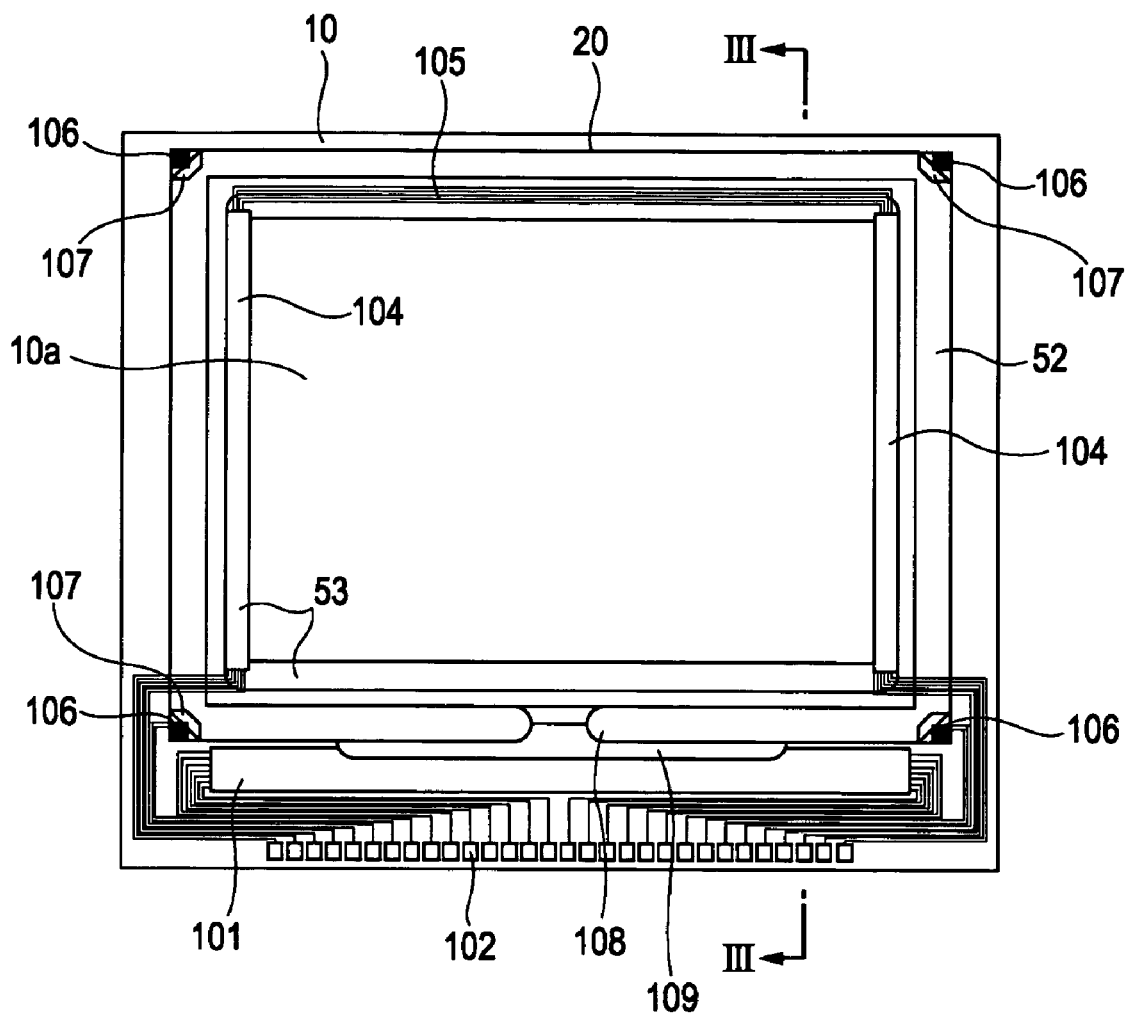
FIG. 2 is a plan view of the electro-optical device, according to the first embodiment, viewed from the side of a counter substrate.
Figure 3:
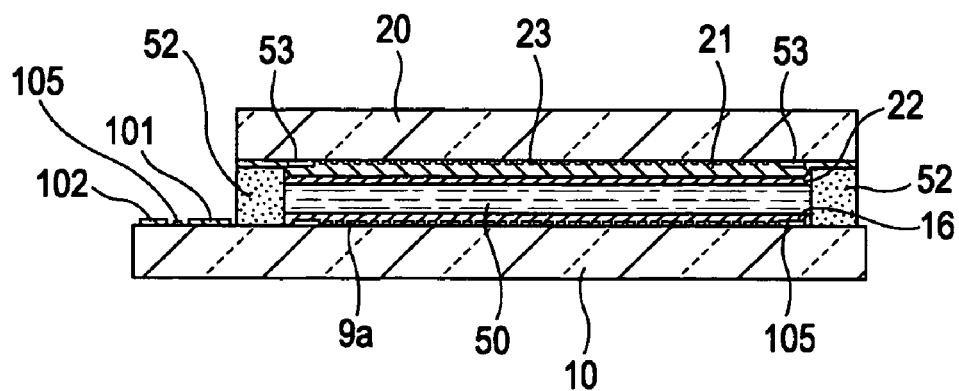
FIG. 3 is a sectional view of the electro-optical device according to the first embodiment taken along the line III-III of FIG. 2.
Figure 4:
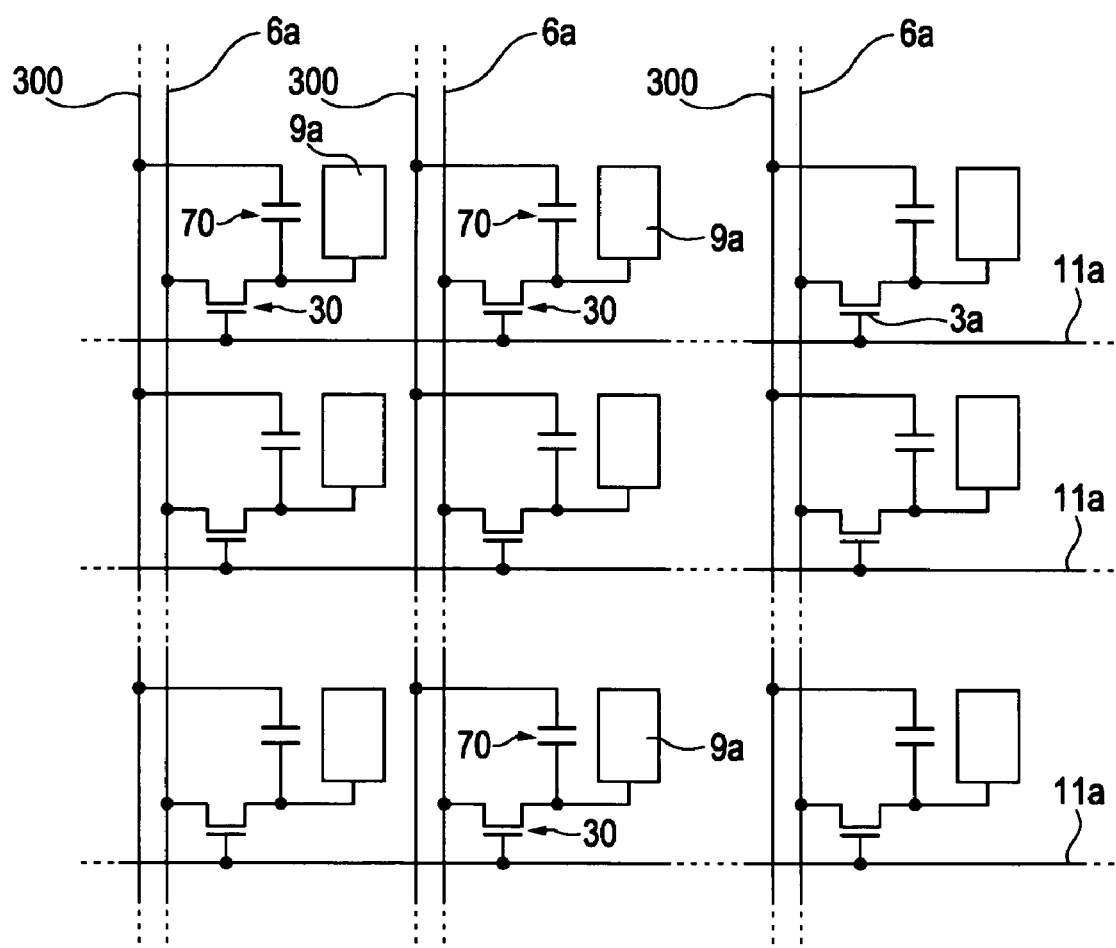
FIG. 4 is a diagram of a circuit including various elements and wires connected to pixels arranged in pixel regions included in the electro-optical device.
Figure 5:
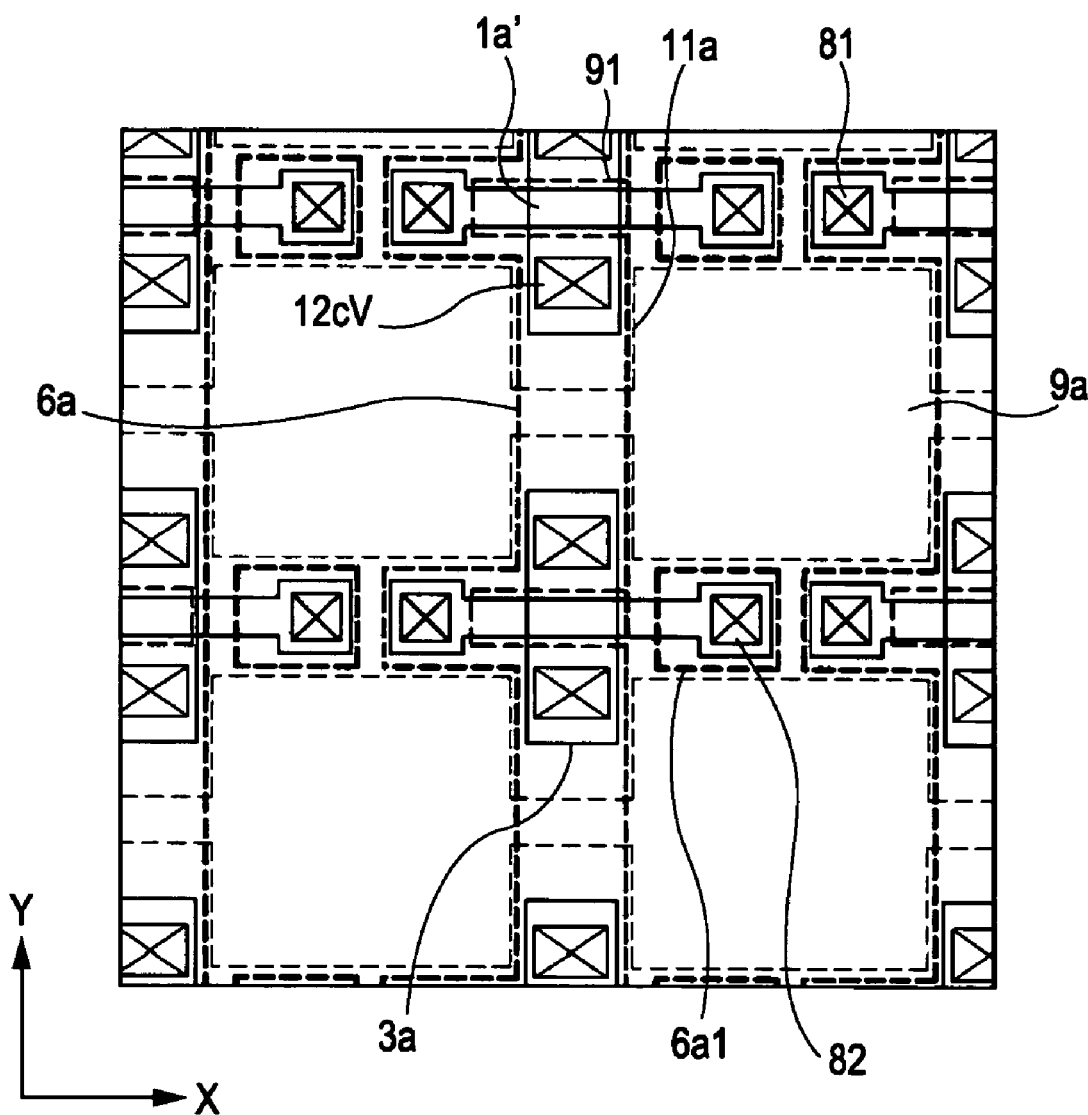
FIG. 5 is a plan view of a principal part of the electro-optical device.

FIG. 1 is a sectional view showing the configuration of a pixel included in an electro-optical device according to a first embodiment of the present invention. The electro-optical device is a type of liquid crystal device including a TFT substrate. FIG. 2 is a plan view of the electro-optical device viewed from the side of a counter substrate. FIG. 3 is a sectional view of the electro-optical device taken along the line III-III of FIG. 2. FIG. 4 is a diagram of a circuit including various elements and wires connected to pixels arranged in pixel regions included in the electro-optical device. FIG. 5 is a plan view of a principal part of the electro-optical device. In order to show layers and members in the drawings on a recognizable scale, different scales are used depending on the size of the layers and members.

The configuration of the electro-optical device will now be described with reference to FIGS. 2 to 4. With reference to FIGS. 2 and 3, the electro-optical device includes a TFT substrate 10 made of glass, silicon, or quartz; a counter substrate 20 made of glass or quartz; and a liquid crystal layer 50 disposed therebetween. The TFT substrate 10 and the counter substrate 20 are joined to each other with a sealing member 52.

Pixel electrodes 9a, made of ITO, included in pixels are arranged above the TFT substrate 10 in a matrix pattern. A counter electrode 21 made of ITO extends over the counter substrate 20. A first alignment layer 16 that is rubbed overlies the pixel electrodes 9a. A second alignment layer 22 that is rubbed extends over the counter electrode 21. The first and second alignment layers 16 and 22 are made of a transparent organic material such as polyimide.

FIG. 4 shows a circuit including elements arranged above the TFT substrate 10. With reference to FIG. 4, a plurality of scanning lines 11a intersect with a plurality of data lines 6a and the pixel electrodes 9a are located in the pixel regions partitioned by the scanning lines 11a and the data lines 6a. The pixel electrodes 9a are connected to TFTs 30 that are arranged to correspond to the intersections of the scanning lines 11a and the data lines 6a.

The TFTs 30 are turned on by on-signals applied to the scanning lines 11a, whereby image signals applied to the data lines 6a are supplied to the pixel electrodes 9a. The voltages between the pixel electrodes 9a and the counter electrode 21 are applied to the liquid crystal layer 50. Storage capacitors 70 are arranged in parallel to the pixel electrodes 9a and hold the voltages of the pixel electrodes 9a for a time that is, for example, three orders of magnitude longer than the time that source voltages are applied. The storage capacitors 70 enhance voltage-holding characteristics of the pixel electrodes 9a to allow a high-contrast image to be displayed.

FIG. 1 shows one pixel included in the electro-optical device and FIG. 5 shows the pattern of layers included in the electro-optical device.

With reference to FIG. 5, the pixel electrodes 9a are arranged above the TFT substrate 10 in a matrix pattern. The data lines 6a and the scanning lines 11a extend along the boundaries between the pixel electrodes 9a, the data lines 6a and the scanning lines 11a being represented by extra-thick broken lines and thin broken lines, respectively, in FIG. 5. The data lines 6a may have a single-layer structure including a layer of aluminum or a multilayer structure including a layer of aluminum and a layer of another metal material as described below. The scanning lines 11a each include a conductive polysilicon layer, a tungsten silicide layer, or another layer. The scanning lines 11a are electrically connected to gate electrodes 3a opposed to channel regions 1a' included in semiconductor layers 1a, the gate electrodes 3a being represented by thin lines in FIG. 5. That is, the gate electrodes 3a and channel regions 1a' opposed to each other are located at the intersections of the scanning lines 11a and the data lines 6a to form the TFTs 30.

Various layers are arranged above the TFT substrate 10 in addition to the TFTs 30 and the pixel electrodes 9a. With reference to FIG. 1, the following layers are arranged on the TFT substrate 10 in this order: a first layer including the scanning lines 11a, a base insulating layer 12, a second layer including the TFTs 30 and the like, a first interlayer insulating layer 41, a third layer including the data lines 6a and the like, a second interlayer insulating layer 42, a fourth layer including the storage capacitors 70, a third interlayer insulating layer 43, and a fifth layer including the pixel electrodes 9a and the first alignment layer 16. The base, first, second, and third insulating layers 12, 41, 42, and 43 prevent these components from being short-circuited and have contact holes for electrically connecting the data lines 6a to heavily doped source regions 1d present in the semiconductor layers 1a. These components will now be described in this order.

The first layer includes the scanning lines 11a. The scanning lines 11a are made of a refractory metal such as titanium (Ti), chromium (Cr), tungsten (W), tantalum (Ta), or molybdenum (Mo); an alloy containing at least one of Ti, Cr, W, Ta, and Mo; a metal silicide; a polysilicide; or conductive silicon or include layers containing at least one of these materials. The scanning lines 11a are arranged in a striped pattern so as to extend in the X direction in FIG. 5 and have protrusions extending in the X direction in FIG. 5 when viewed from above. The protrusions of one scanning line 11a are not in contact with those of other scanning lines 11a, that is, the scanning lines 11a are spaced from each other.

Therefore, the scanning lines 11a have a function of simultaneously turning the TFTs 30 arranged in one row on or off. The scanning lines 11a cover portions exposed from the pixel electrodes 9a and therefore have a function of shielding the TFTs 30 from light traveling upward. This prevents photo-leakage currents from being caused in the semiconductor layers 1a, thereby displaying a high-quality image with no flicker.

The second layer includes the TFTs 30. The TFTs 30 preferably have a lightly doped drain (LDD) structure as shown in FIG. 1. The TFTs 30 include the gate electrodes 3a, the channel regions 1a' which are made of polysilicon and in which channels are formed by applying voltages to the gate electrodes 3a, insulating layers 2 including gate insulating sublayers for insulating the gate electrodes 3a from the semiconductor layers 1a, lightly doped source regions 1b, lightly doped drain regions 1c, the heavily doped source regions 1d, and heavily doped drain regions 1e. The channel regions 1a', the lightly doped source regions 1b, the lightly doped drain regions 1c, the heavily doped source regions 1d, and the heavily doped drain regions 1e are present in the semiconductor layers 1a.

Alternatively, the TFTs 30 may have an offset structure in which no impurity ions are implanted into the lightly doped source regions 1b or the lightly doped drain regions 1c or a self-aligned structure in which the heavily doped source regions 1d and the heavily doped drain regions 1e are formed in a self-aligned manner by heavily implanting impurity ions into the semiconductor layers 1a. In this embodiment, the TFTs 30 have a single gate structure in which one of the gate electrodes 3a is placed between each heavily doped source region 1d and heavily doped drain region 1e. Two or more of the gate electrodes 3a may be placed therebetween. When the TFTs 30 have a dual or triple gate structure, currents can be prevented from leaking through the junctions between the channel regions 1a' and the lightly doped source regions 1b or the lightly doped drain regions 1c, thereby reducing off-currents. The semiconductor layers 1a may be single-crystalline or not. When the semiconductor layers 1a are single-crystalline, a known process such as a bonding process can be used to form the semiconductor layers 1a and peripheral circuits having high performance can be used.

The base insulating layer 12 is disposed on the scanning lines 11a and under the TFTs 30 and is made of, for example, silicon dioxide or the like. The base insulating layer 12 has a function of insulating the scanning lines 11a from the TFTs 30. Since the base insulating layer 12 extends over the TFT substrate 10, the base insulating layer 12 prevents the TFT substrate 10 from roughened by surface grinding and also prevents properties of the TFTs 30 from being varied due to contaminants remaining after cleaning.

The base insulating layer 12 has slots 12cv serving as contact holes. The gate electrodes 3a have portions 3b that occupy the respective slots 12cv and the lower ends of the portions 3b of the gate electrodes 3a are in contact with the scanning lines 11a. Therefore, the scanning lines 11a and gate electrodes 3a arranged in one row have the same potential. The electro-optical device may further include additional scanning lines which includes the gate electrodes 3a and which extend along the scanning lines 11a. In this case, the scanning lines 11a and the additional scanning lines form a redundant wiring structure. Thus, even if some of the scanning lines 11a have defects and therefore electrical conduction cannot be established, the TFTs 30 can be normally controlled through the additional scanning lines arranged in the same row as that of the scanning lines 11a unless the additional scanning lines have any defects.

The third layer includes the data lines 6a. The data lines 6a are arranged in a striped pattern so as to extend in the direction in which the semiconductor layers 1a extend. That is, the data lines 6a extend in the Y direction in FIG. 5. The data lines 6a are made of, for example, an aluminum material having high reflectance. The data lines 6a may have a multilayer structure in which a layer of titanium nitride overlies a layer of aluminum.

Since the data lines 6a contain aluminum that is a material with relatively low resistance, the data lines 6a can securely supply image signals to the TFTs 30 and the pixel electrodes 9a.

The third layer further includes interconnection layers 6a1, formed from the same film as that for forming the data lines 6a, interconnecting with the storage capacitors 70. With reference to FIG. 5, the data lines 6a and the interconnection layers 6a1 are not in contact with each other but are spaced from each other in plan view.

The interconnection layers 6a1 are formed in a step of forming the data lines 6a and include aluminum layers and titanium nitride layers lying thereon. The titanium nitride layers serve as barrier metal layers for preventing the interconnection layers 6a1 from being etched through when first contact holes 83 are formed in the interconnection layers 6a1.

In this embodiment, the third layer further includes anti-reflective layers 91 which underlie the aluminum layers of the data lines 6a and which are opposed to the TFTs 30 included in the second layer. The anti-reflective layers 91 are represented by thick broken lines in FIG. 5. The anti-reflective layers 91 extend to cover the respective channel regions 1a' under the gate electrodes 3a when viewed from above. Alternatively, the anti-reflective layers 91 may extend to cover the respective semiconductor layers 1a when viewed from above. The anti-reflective layers 91 do not extend out of the data lines 6a when viewed from above. Furthermore, the anti-reflective layers 91 do not extend to second contact holes 81 or third contact holes 82 described below.

The fourth layer includes the storage capacitors 70. The storage capacitors 70 include lower electrodes 71 serving as pixel potential capacitor electrodes, capacitor lines 300 serving as constant potential capacitor electrodes, and dielectric layers 75 each disposed between the corresponding lower electrodes 71 and capacitor lines 300. The lower electrodes 71 are opposed to the capacitor lines 300 and are connected to the heavily doped drain regions 1e and the pixel electrodes 9a. The storage capacitors 70 can greatly enhance voltage-holding characteristics of the pixel electrodes 9a. With reference to FIG. 5, the storage capacitors 70 do not extend to light-transmitting regions that substantially correspond to regions for forming the pixel electrodes 9a, that is, the storage capacitors 70 do not extend out of the light-shielding regions; hence, the electro-optical device has a relatively large aperture ratio as a whole. This allows the electro-optical device to display a brighter image.

The lower electrodes 71 include metal layers. The lower electrodes 71 may be formed from a single-layer or multi-layer film made of metal or alloy. The lower electrodes 71 connect the pixel electrodes 9a to the heavily doped drain regions 1e.

The capacitor lines 300 serve as such constant potential capacitor electrodes for the storage capacitors 70. The capacitor lines 300 may be connected to a positive or negative constant potential source for supplying power to a data line-driving circuit 101 described below or connected to a constant potential source for supplying power to the counter electrode 21. The capacitor lines 300 include aluminum layers 301 and titanium nitride layers 302 lying thereon, that is, the capacitor lines 300 have a two-layer structure. The capacitor lines 300 are arranged above the TFT substrate 10 in a dotted pattern so as to correspond to the pixels. The lower electrodes 71 have substantially the same shape as that of the capacitor lines 300.

Therefore, the storage capacitors 70 have no excess area in plan view. This maximizes the capacitance of the storage capacitors 70 without causing a reduction in the aperture ratio of the electro-optical device. That is, the storage capacitors 70 have a small area and a large capacitance.

The dielectric layers 75 are made of silicon dioxide or silicon nitride and have a thickness of about 5 to 200 nm. In view of an increase in the capacitance of the storage capacitors 70, the dielectric layers 75 preferably have a small thickness as long as the dielectric layers 75 have sufficient reliability.

The first interlayer insulating layer 41 is disposed on the TFTs 30 and the gate electrodes 3a and under the data lines 6a and is made of silicate glass such as nondoped silicate glass (NSG), phosphorus silicate glass (PSG), boron silicate glass (BSG), or boron phosphorus silicate glass (BPSG); silicon nitride; or silicon dioxide. The first interlayer insulating layer 41 is preferably made of NSG. The first interlayer insulating layer 41 has the second contact holes 81 for electrically connecting the heavily doped source regions 1d of the TFTs 30 to the data lines 6a. The first interlayer insulating layer 41 further has the third contact holes 82 for electrically connecting the heavily doped drain regions 1e of the TFTs 30 to the interconnection layers 6a1.

The second interlayer insulating layer 42 is disposed on the data lines 6a and under the storage capacitors 70 and is made of silicate glass such as NSG, PSG, BSG, or BPSG; silicon nitride; or silicon dioxide. The second interlayer insulating layer 42 is preferably formed by a plasma-enhanced chemical vapor deposition (PECVD) process using gaseous tetraethyl orthosilicate (TEOS). The second interlayer insulating layer 42 has the first contact holes 83 for electrically connecting the interconnection layers 6a1 to the lower electrodes 71 of the storage capacitors 70. That is, the heavily doped drain regions 1e of the TFTs 30 are electrically connected to the lower electrodes 71 of the storage capacitors 70 through the third contact holes 82, the interconnection layers 6a1, and the first contact holes 83.

The fifth layer includes the pixel electrodes 9a arranged in a matrix pattern and the first alignment layer 16 lying thereon. The third interlayer insulating layer 43 underlies the pixel electrodes 9a and is made of silicate glass such as NSG, PSG, BSG, or BPSG; silicon nitride; or silicon dioxide. The third interlayer insulating layer 43 is preferably formed by a PECVD process using gaseous TEOS. The third interlayer insulating layer 43 has fourth contact holes 84 for electrically connecting the pixel electrodes 9a to the lower electrodes 71 of the storage capacitors 70.

The second and third insulating layers 42 and 43 are planarized by chemical mechanical polishing (CMP). Hence, the liquid crystal layer 50 can be prevented from suffering from misalignment due to irregularities caused by various wires and elements present under the second and third insulating layers 42 and 43.

With reference to FIGS. 2 and 3, a first light-shielding layer 53 and a second light-shielding layer 23 are arranged on the counter substrate 20. The first light-shielding layer 53 surrounds an image display region 10a and serves as a frame. The counter electrode 21 extends over the counter substrate 20 and the second alignment layer 22 extends over the counter electrode 21 as described above. The second alignment layer 22 is rubbed such that molecules of a liquid crystal contained in the liquid crystal layer 50 have a predetermined tilt angle.

The sealing member 52 is located outside the first light-shielding layer 53 and sandwiched between the TFT substrate 10 and the counter substrate 20 so as to seal the liquid crystal layer 50. The outline of the sealing member 52 substantially coincides with that of the counter substrate 20. The TFT substrate 10 and the counter substrate 20 are joined to each other with the sealing member 52. Both ends of the sealing member 52 are located on a side portion of the TFT substrate 10 and spaced from each other. A liquid crystal injection port 108 is located between the ends of the sealing member 52. The liquid crystal is injected into a space between the TFT substrate 10 and the counter substrate 20 through the liquid crystal injection port 108. After the injection of the liquid crystal, the liquid crystal injection port 108 is sealed with a sealant 109.

The following circuit and terminals are arranged in a region which is located outside the sealing member 52 and which extends along a side of the TFT substrate 10: a data line-driving circuit 101 and external connection terminals 102 connected to external circuits. The data line-driving circuit 101 applies image signals to the data lines 6a at predetermined timing to drive the data lines 6a. Scanning line-driving circuits 104 extend along the two sides adjacent to this side of the TFT substrate 10. The scanning line-driving circuits 104 apply scanning signals to the scanning lines 11a and the gate electrodes 3a to drive the gate electrodes 3a. The scanning line-driving circuits 104 are arranged above the TFT substrate 10 so as to be opposed to the first light-shielding layer 53 located inside the sealing member 52. Connection wires 105 are also are arranged on the TFT substrate 10 so as to be opposed to three sides of the first light-shielding layer 53. The connection wires 105 connect the data line-driving circuit 101, the scanning line-driving circuits 104, the external connection terminals 102, and vertical conduction terminals 107.

The vertical conduction terminals 107 are arranged on the TFT substrate 10 and located at four corners of the sealing member 52. Vertical conduction members 106 are arranged between the TFT substrate 10 and the counter substrate 20. The lower ends of the vertical conduction members 106 are in contact with the vertical conduction terminals 107 and the upper ends thereof are in contact with the counter electrode 21. The TFT substrate 10 and the counter substrate 20 are electrically connected to each other with the vertical conduction members 106.

The data lines 6a may have a single-layer structure made of a metal material such as aluminum or a multilayer structure made of different metal materials. The data lines 6a may have, for example, a five-layer structure consisting of a Ti layer having low reflectance, a titanium nitride layer, an aluminum layer, a titanium layer, and a titanium nitride layer arranged in that order from the bottom.

The data lines 6a are connected to the heavily doped drain regions 1e in the semiconductor layers 1a with the second contact holes 81 as described above. The semiconductor layers 1a, which are included in the TFTs 30, have an extremely small thickness. When the lowermost portions of the data lines 6a contain titanium, titanium reacts with silicon in the heavily doped drain regions 1e included in the semiconductor layers 1a made of polysilicon, thereby reducing the thickness of the semiconductor layers 1a. This causes an increase in the resistance of contacts between the data lines 6a and the heavily doped drain regions 1e, resulting in contact failure. Therefore, the lowermost portions of the data lines 6a, which are connected to the TFTs 30, are made of aluminum.

Since the lowermost portions of the data lines 6a are made of aluminum, the following problem can be caused: a problem that the semiconductor layers 1a, particularly the channel regions 1a', are irradiated with light reflected by the lowermost portions thereof. Therefore, in this embodiment, the anti-reflective layers 91 are arranged on the lowermost portions of the data lines 6a. The anti-reflective layers 91 extend to cover the channel regions 1a' when viewed from above. The anti-reflective layers 91 preferably entirely cover the semiconductor layers 1a. In order to prevent a reduction in aperture ratio, the anti-reflective layers 91 are preferably located in regions that are shielded from light by the data lines 6a. In order to prevent an increase in contact resistance, the anti-reflective layers 91 do not extend to the second and third contact holes 81 and 82.

Light incident on the counter substrate 20 passes through the counter substrate 20, the liquid crystal layer 50, and then the TFT substrate 10. Therefore, a displayed image can be seen in such a manner that light passing through the TFT substrate 10 is observed. The data lines 6a and interconnection layers 6a1 located on the side of the counter substrate 20 extend to cover the TFTs 30. Hence, light incident on the counter substrate 20 is reflected by the data lines 6a and the interconnection layers 6a1 and therefore is prevented from reaching the TFTs 30.

Portions of light entering the electro-optical device are reflected from the TFT substrate 10 to the counter substrate 20. The reflected light portions can travel to the lowermost portions of the data lines 6a while the light portions are being repeatedly reflected and scattered. Since the anti-reflective layers 91 are arranged on the lowermost portions of the data lines 6a, the light portions traveling to the lowermost portions of the data lines 6a are prevented from being reflected toward the TFTs 30 and therefore cannot reach the TFTs 30.

As described above, the TFTs 30 are shielded from light and therefore prevented from malfunctioning. This prevents the leakage of light.

A method for manufacturing the electro-optical device of this embodiment will now be described.

The TFT substrate 10, which is made of glass, silicon, or quartz, is first prepared. The TFT substrate 10 is preferably annealed at about at an elevated temperature of 900° C. to 1,300° C. in an inert atmosphere such as a nitrogen atmosphere such that the TFT substrate 10 is prevented from being warped in a subsequent high-temperature step.

The following film is formed on the resulting TFT substrate 10 by sputtering so as to have a thickness of about 100 to 500 nm, preferably about 200 nm: a film made of metal such as Ti, Cr, W, Ta, or Mo; a metal silicide, or alloy. This film is patterned by photolithography and etching, whereby the scanning lines 11a are formed so as to be arranged in a striped pattern in plan view.

The base insulating layer 12 is formed over the scanning lines 11a at atmospheric pressure or under vacuum by a chemical vapor deposition (CVD) process or another process using gaseous TEOS, triethyl borate (TEB), trimethyl phosphate (TMOP), or the like. The base insulating layer 12 is made of silicate glass such as NSG, PSG, BSG, or BPSG; silicon nitride; or silicon dioxide and has a thickness of about 500 to 2,000 nm.

The semiconductor layers 1a are formed on the base insulating layer 12 as described below. An amorphous silicon film is formed on the base insulating layer 12 by a CVD process under the following conditions: a temperature of about 450° C. to 550° C., preferably about 500° C.; a monosilane or disilane gas flow rate of 400 to 600 cc/min; and a reduced pressure of about 20 to 40 Pa. The amorphous silicon film is heat-treated at about 600° C. to 700° C. for about one to ten hours, preferably about four to six hours, in a nitrogen atmosphere, whereby the amorphous silicon film is converted into a polysilicon (p-Si) film. The p-Si film is subjected to solid phase growth so as to have a thickness of about 50 to 200 nm, preferably about 100 nm. Examples of a process for subjecting the p-Si film to solid phase growth include rapid thermal annealing (RTA) processes and laser annealing processes using excimer lasers. In this step, the resulting p-Si film may be lightly doped with a dopant such as a group III or V element by ion implantation or the like depending on if the TFTs 30 are of an n- or p-channel type. The resulting p-Si film is then patterned by photolithography and etching, whereby the semiconductor layers 1a are formed.

The semiconductor layers 1a for forming the TFTs 30 are heat-oxidized at a temperature of about 900° C. to 1,300° C., preferably about 1,000° C., whereby lower gate insulating layers are formed. Upper gate insulating layers are formed on the lower gate insulating layers by a vacuum CVD process, whereby the insulating layers 2, which include the gate insulating sublayers, are formed. The insulating layers 2 have a single-layer or multilayer structure and are made of a hot-temperature oxide (HTO) or silicon nitride. The semiconductor layers 1a preferably have a thickness of about 30 to 150 nm and more preferably about 35 to 50 nm. The insulating layers 2 preferably have a thickness of about 20 to 150 nm and more preferably about 30 to 100 nm.

In order to control the threshold voltage of the TFTs 30, n- or p-channel regions present in the semiconductor layers 1a are doped with a dopant such as boron at a predetermined dose by ion implantation or the like.

The slots 12cv are formed in the base insulating layer 12 so as to extend to the scanning lines 11a. The slots 12cv can be formed by a dry etching process such as a reactive ion etching process or a reactive ion beam etching process.

A polysilicon film is deposited on the base insulating layer 12 and then doped with phosphorus (P) by thermal diffusion, whereby this polysilicon film is made conductive. Alternatively, P ions may be implanted into this polysilicon film instead of the thermal diffusion of P. This polysilicon film preferably has a thickness of about 100 to 500 nm and more preferably about 350 nm. This polysilicon film is patterned by photolithography and etching, whereby the gate electrodes 3a and gate electrode sections of the TFTs 30 are formed.

The following regions are formed in the semiconductor layers 1a: the lightly doped source regions 1b, the lightly doped drain regions 1c, the heavily doped source regions 1d, and the heavily doped drain regions 1e.

Since the TFTs 30 have the LDD structure and are of a n-channel type as described above, the lightly doped source regions 1b and the lightly doped drain regions 1c are primarily formed in such a manner that the semiconductor layers 1a are lightly doped with a group V element dopant such as P at a dose of, for example, $1 \times 10^{13}$ to $3 \times 10^{13}$ cm$^2$ using the gate electrodes 3a as masks. In this operation, areas of the semiconductor layers 1a that are located under the gate electrodes 3a are converted into the channel regions 1a'. Since the gate electrodes 3a serve as masks, the lightly doped source regions 1b and the lightly doped drain regions 1c are formed in a self-aligned manner. A resist layer is formed over the gate electrodes 3a and then patterned so as to have portions having a width greater than that of the gate electrodes 3a. The semiconductor layers 1a are then heavily doped with the group V element dopant at a dose of, for example, $1 \times 10^{15}$ to $3 \times 10^{15}$ cm$^2$, whereby the heavily doped source regions 1d and the heavily doped drain regions 1e are formed.

The semiconductor layers 1a need not be necessarily lightly and then heavily doped in two stages. When the TFTs 30 have an offset structure, light doping need not be performed. When the TFTs 30 are of a self-aligned type, P ions and/or B ions may be implanted into the semiconductor layers 1a. The gate electrodes 3a doped with these dopants have a reduced resistance.

The first interlayer insulating layer 41, which is made of silicate glass such as NSG, PSG, BSG, or BPSG; silicon nitride; or silicon dioxide, is formed over the gate electrodes 3a at atmospheric pressure or under vacuum by a CVD process or another process using gaseous TEOS, TEB, TMOP, or the like. The first interlayer insulating layer 41 has a thickness of about 500 to 2,000 nm. The first interlayer insulating layer 41 is preferably annealed at an elevated temperature of about 800° C. such that properties of the first interlayer insulating layer 41 are enhanced.

The second and third contact holes 81 and 82 are formed in the first interlayer insulating layer 41 by a dry etching process such as a reactive ion etching process or a reactive ion beam etching process such that the second contact holes 81 extend to the heavily doped source regions 1d and the third contact holes 82 extend to the heavily doped drain regions 1e.

A film for forming the anti-reflective layers 91 is formed over the first interlayer insulating layer 41 by sputtering or the like so as to have a predetermined thickness. This film is preferably made of a material, such as Cr, Ti, titanium nitride (TiN), W, or tungsten silicide (WSi), having low light reflectance. This film preferably has a thickness equal to about ten percent of the thickness of the data lines 6a, that is, a thickness of about 50 nm.

This film is patterned by photolithography and etching, whereby the anti-reflective layers 91 are formed so as to cover the channel regions 1a'. The anti-reflective layers 91 may cover the semiconductor layers 1a. In this case, the anti-reflective layers 91 are formed in regions other than the second and third contact holes 81 and 82. With reference to FIG. 5, the anti-reflective layers 91 extend to cover the respective channel regions 1a'.

A film of aluminum, which is a light-shielding material with low resistance, is formed over the anti-reflective layers 91 and the first interlayer insulating layer 41 by sputtering or the like so as to have a thickness of about 100 to 500 nm, preferably about 350 nm. The aluminum film is patterned by photolithography and etching, whereby the aluminum layers are formed so as to be arranged in the same pattern as that of the data lines 6a. In this operation, the interconnection layers 6a1 are also formed. The interconnection layers 6a1 extend over the walls of the third contact holes 82.

A film of titanium nitride is formed over the aluminum layers and the interconnection layers 6a1 by a PECVD process or the like. The titanium nitride film is then patterned such that portions of the titanium nitride film remain on the aluminum layers, whereby titanium nitride layers are formed. This provides the data lines 6a including the aluminum layers and the titanium nitride layers lying thereon. The titanium nitride layers may remain on the interconnection layers 6a1. The interconnection layers 6a1 may be formed by etching the aluminum film. The titanium nitride layers preferably have a thickness of about 150 nm and therefore the data lines 6a preferably have a thickness of about 500 nm.

The second interlayer insulating layer 42 is formed over the data lines 6a at atmospheric pressure or under vacuum by a CVD process, preferably a PECVD process, using gaseous TEOS or the like. The second interlayer insulating layer 42 is preferably made of silicate glass such as NSG, PSG, BSG, or BPSG; silicon nitride; or silicon dioxide. The second interlayer insulating layer 42 has a thickness of about 500 to 3,500 nm.

As shown in FIG. 1, the second interlayer insulating layer 42 is planarized by, for example, CMP.

The first contact holes 83 are formed in the second interlayer insulating layer 42 by a dry etching process such as a reactive ion etching process or a reactive ion beam etching process so as to extend in the interconnection layers 6a1.

A metal film, such as a Pt film is formed over the second interlayer insulating layer 42 by vacuum CVD or sputtering so as to have a thickness of about 100 to 500 nm and then patterned, whereby the lower electrodes 71 are formed. The lower electrodes 71 extend over the walls of the first contact holes 83. This allows the lower electrodes 71 to be electrically connected to the heavily doped drain regions 1e through the interconnection layers 6a1.

A dielectric film for forming the dielectric layers 75 is formed over the metal film. The dielectric film, as well as the insulating layers 2, can be formed by a known process usually used to form gate insulating layers for ordinary TFTs. Since a reduction in the thickness of the dielectric layers 75 increases the capacitance of the storage capacitors 70, the dielectric film preferably has an extremely small thickness unless the dielectric film has defects such as holes. In particular, the dielectric film preferably has a thickness of 50 nm or less. An aluminum thin-film for forming the aluminum layers 301 is formed over the dielectric film by vacuum CVD or sputtering so as to have a thickness of about 100 to 500 nm. A titanium nitride thin-film for forming the titanium nitride layers 302 is formed over the aluminum thin-film by vacuum CVD or sputtering, whereby a multilayer film, including the aluminum thin-film and the titanium nitride thin-film, for forming the capacitor lines 300 is formed.

The metal film, the dielectric film, and the multilayer film are simultaneously patterned, whereby the lower electrodes 71, the dielectric layers 75, and the capacitor lines 300 are formed. This results in the completion of the storage capacitors 70.

The third interlayer insulating layer 43 is formed over the storage capacitors 70 at atmospheric pressure or under vacuum by a CVD process, preferably a PECVD process, using gaseous TEOS or the like. The third interlayer insulating layer 43 is preferably made of silicate glass such as NSG, PSG, BSG, or BPSG; silicon nitride; or silicon dioxide. The third interlayer insulating layer 43 has a thickness of about 500 to 1,500 nm. As shown in FIG. 1, the third interlayer insulating layer 43 is planarized by, for example, CMP. The fourth contact holes 84 are formed in the resulting third interlayer insulating layer 43 by a dry etching process such as a reactive ion etching process or a reactive ion beam etching process so as to extend to the lower electrodes 71.

A transparent conductive film made of ITO or the like is deposited on the third interlayer insulating layer 43 by sputtering so as to have a thickness of about 50 to 200 nm. The transparent conductive film is patterned by photolithography and etching, whereby the pixel electrodes 9a are formed.

A coating solution, containing polyimide, for forming the first and second alignment layers 16 and 22 is applied over the pixel electrodes 9a and then dried, whereby the first alignment layer 16 is formed. The first alignment layer 16 is rubbed in a predetermined direction such that the liquid crystal molecules have a predetermined pretilt angle.

On the other hand, the counter substrate 20 is prepared by processing a glass plate. A metal film such as a chromium film is deposited on the counter substrate 20 by sputtering and then patterned by photolithography and etching, whereby the first and second light-shielding layer 53 and 23 are formed. The first and second light-shielding layer 53 and 23 need not be conductive and may be made of a material, such as resin black prepared by dispersing carbon or titanium in a photoresist, other than a metal material such as chromium, nickel, or aluminum.

A transparent conductive layer made of ITO or the like is deposited on the counter substrate 20 by sputtering or the like so as to have a thickness of about 50 to 200 nm, whereby the counter electrode 21 is formed. The coating solution is applied over the counter electrode 21 and then dried, whereby the second alignment layer 22 is formed. The second alignment layer 22 is rubbed in a predetermined direction such that the liquid crystal molecules have a predetermined pretilt angle.

The sealing member 52 is provided above the counter substrate 20 so as to extend along the four sides of the counter substrate 20. The vertical conduction members 106 are provided at the four corners of the sealing member 52. Finally, the resulting counter substrate 20 is joined to the TFT substrate 10 with the sealing member 52 as shown in FIGS. 2 and 3. The lower ends of the vertical conduction members 106 are in contact with the vertical conduction terminals 107 arranged on the TFT substrate 10 and the upper ends thereof are in contact with the counter electrode 21 disposed on the counter substrate 20.

The liquid crystal is injected into the space between the TFT substrate 10 and the counter substrate 20 by vacuum aspiration, whereby the liquid crystal layer 50 is formed so as to have a predetermined thickness. A mixture of different nematic liquid crystals may be used instead of the liquid crystal.

The sealing member 52 is made of an ultraviolet curable resin, a thermosetting resin, or another resin and is cured with ultraviolet rays or by heating when the TFT substrate 10 and the counter substrate 20 are joined to each other. If the electro-optical device is used for a small-sized apparatus, such as a projector, displaying an image at high magnification, glass fibers or glass beads called a gap member or a spacer are dispersed in a region inside the sealing member 52 such that the distance or gap between the TFT substrate 10 and the counter substrate 20 is maintained at a predetermined value. If the electro-optical device is used for a large-sized apparatus, such as a liquid crystal display or a liquid crystal television, displaying an image at 1× magnification, the liquid crystal layer 50 may contain such a gap member. When the electro-optical device is used, the external connection external connection terminals 102 are connected to a flexible printed circuit (FPC) board.

If the delay in scanning signals applied to the scanning lines 11a and the gate electrodes 3a causes no problem, a single scanning line-driving circuit may be used instead of the scanning line-driving circuits 104. Data line-driving circuits may be arranged along both sides of the image display region 10a.

The following circuits may be arranged above the TFT substrate 10 in addition to the data line-driving circuit 101 and the scanning line-driving circuits 104: a sampling circuit for applying image signals to the data lines 6a at predetermined timing, a precharge circuit for applying precharge signals with a predetermined voltage to the data lines 6a in advance to the image signals, and an inspection circuit for checking defects or the quality of the electro-optical device in manufacturing steps or at the point of delivery.

In this embodiment, the data line-driving circuit 101 and the scanning line-driving circuits 104 are arranged above the TFT substrate 10. Instead, the data line-driving circuit 101 and the scanning line-driving circuits 104 may be electrically or mechanically connected to a driving LSI mounted on a tape automated bonding substrate with an anisotropic conductive film. A polarizing film, a retardation film, or a polarizer may be placed on a face of the counter substrate 20 or the TFT substrate 10 on which light is incident depending on an operation mode such as a twisted nematic (TN) mode, a vertically aligned (VA) mode, or a polymer dispersed liquid crystal (PDLC) mode or a display mode such as a normally black mode or a normally white mode.

In this embodiment, the anti-reflective layers 91 are arranged on faces of the data lines 6a that are opposed to the TFTs 30, the data lines 6a being included in the third layer adjacent to the second layer including the TFTs 30 as shown in FIG. 1. However, the data lines 6a need not be adjacent to the second layer. In this case, the same advantages as those described above can be achieved in such a manner that the anti-reflective layers 91 are formed on metal layers located close to the second layer such that light rays reflected by upper metal layers arranged above those metal layers are prevented from reaching the TFTs 30. Interlayer insulating layers made of silicon dioxide may be present between the anti-reflective layers 91 and the data lines 6a. The interlayer insulating layers cover the anti-reflective layers 91 from a chemical such as buffered hydrogen fluoride (BHF) used to form the second and third contact holes 81 and 82 by wet etching. The anti-reflective layers 91 may be connected to a constant potential source. This prevents capacitive coupling from occurring between the gate electrodes 3a and the data lines 6a.

Second Embodiment

Figure 6:
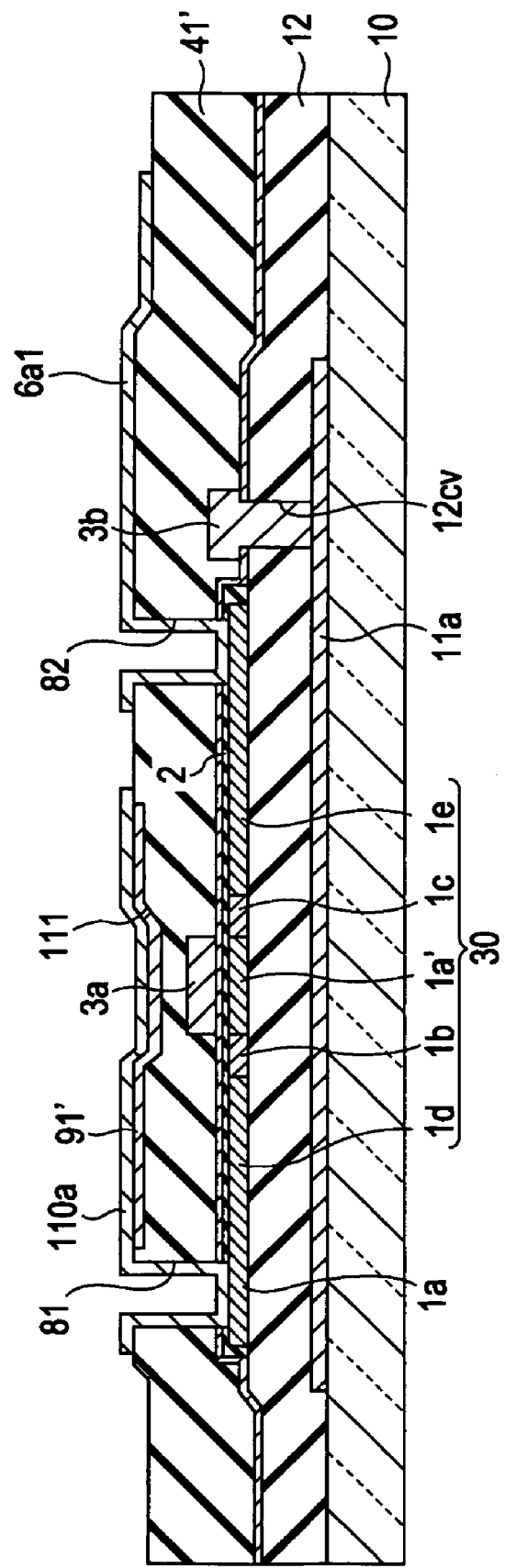
FIG. 6 is a sectional view showing the configuration of a pixel included in an electro-optical device according to a second embodiment of the present invention.

FIG. 6 is a sectional view showing the configuration of a pixel included in an electro-optical device according to a second embodiment of the present invention. The electro-optical device of this embodiment is different from the electro-optical device of the first embodiment in that metal layers which are most close to a layer including transistors and which are included in a third layer have a shape different from that of the metal layers of the electro-optical device of the first embodiment. FIG. 6 simply shows the configuration of the electro-optical device of this embodiment.

With reference to FIG. 6, the third layer includes data lines 110a. The data lines 110a extend in the direction in which semiconductor layers 1a included in TFTs 30 extend, that is, the data lines 110a extend in the Y direction in FIG. 5. The data lines 110a are arranged in a striped pattern. The data lines 110a are made of, for example, an aluminum material having high reflectance. The data lines 110a may have a multilayer structure including an aluminum layer and a titanium nitride layer lying thereon. Since the data lines 110a contain aluminum, which is a material with relatively low resistance, image signals can be readily applied to the TFTs 30 and pixel electrodes 9a.

In this embodiment, a first interlayer insulating layer 41' underlies the data lines 110a and has recessed sections 111, having a small depth, opposed to channel regions 1a' included in the TFTs 30. The data lines 110a extend on the first interlayer insulating layer 41' and therefore have portions located close to the TFTs 30, particularly the channel regions 1a'.

Anti-reflective layers 91' lie on faces of the data lines 110a that are opposed to the TFTs 30. The anti-reflective layers 91', as well as those described in the first embodiment, extend over the respective channel regions 1a' when viewed from above. In this embodiment, the anti-reflective layers 91' lie on the recessed sections 111.

The anti-reflective layers 91' prevent reflected light rays from reaching the TFTs 30. The distance between the TFTs 30 and the data lines 110a is sufficiently small. Hence, if the reflected light rays are further reflected and scattered, the reflected light rays are prevented from traveling between the TFTs 30 and the data lines 110a. Therefore, the reflected light rays can be securely prevented from reaching the TFTs 30.

Other advantages of the electro-optical device of this embodiment are the same as those described in the first embodiment.

In this embodiment, the anti-reflective layers 91' lie on the data lines 110a, which are located most close to the TFTs 30, that is, the anti-reflective layers 91' are located close to the TFTs 30. Hence, reflected light rays can be securely prevented from reaching the TFTs 30.

In this embodiment, the anti-reflective layers 91' lie on the data lines 110a. Instead, the anti-reflective layers 91' may be arranged on metal layers located under the TFTs 30. In this case, light rays reflected by the metal layers can be prevented from reaching the TFTs 30. This prevents the TFTs 30 from malfunctioning and also prevents the leakage of light.

Interlayer insulating layers made of silicon dioxide may be present between the anti-reflective layers 91' and the data lines 6a. The interlayer insulating layers cover the anti-reflective layers 91' from a chemical such as buffered hydrogen fluoride (BHF) used to form second contact holes 81 and third contact holes 82 by wet etching. The anti-reflective layers 91' may be connected to a constant potential source. This prevents capacitive coupling from occurring between the data lines 110a and gate electrodes 3a.

Third Embodiment

Figure 7:
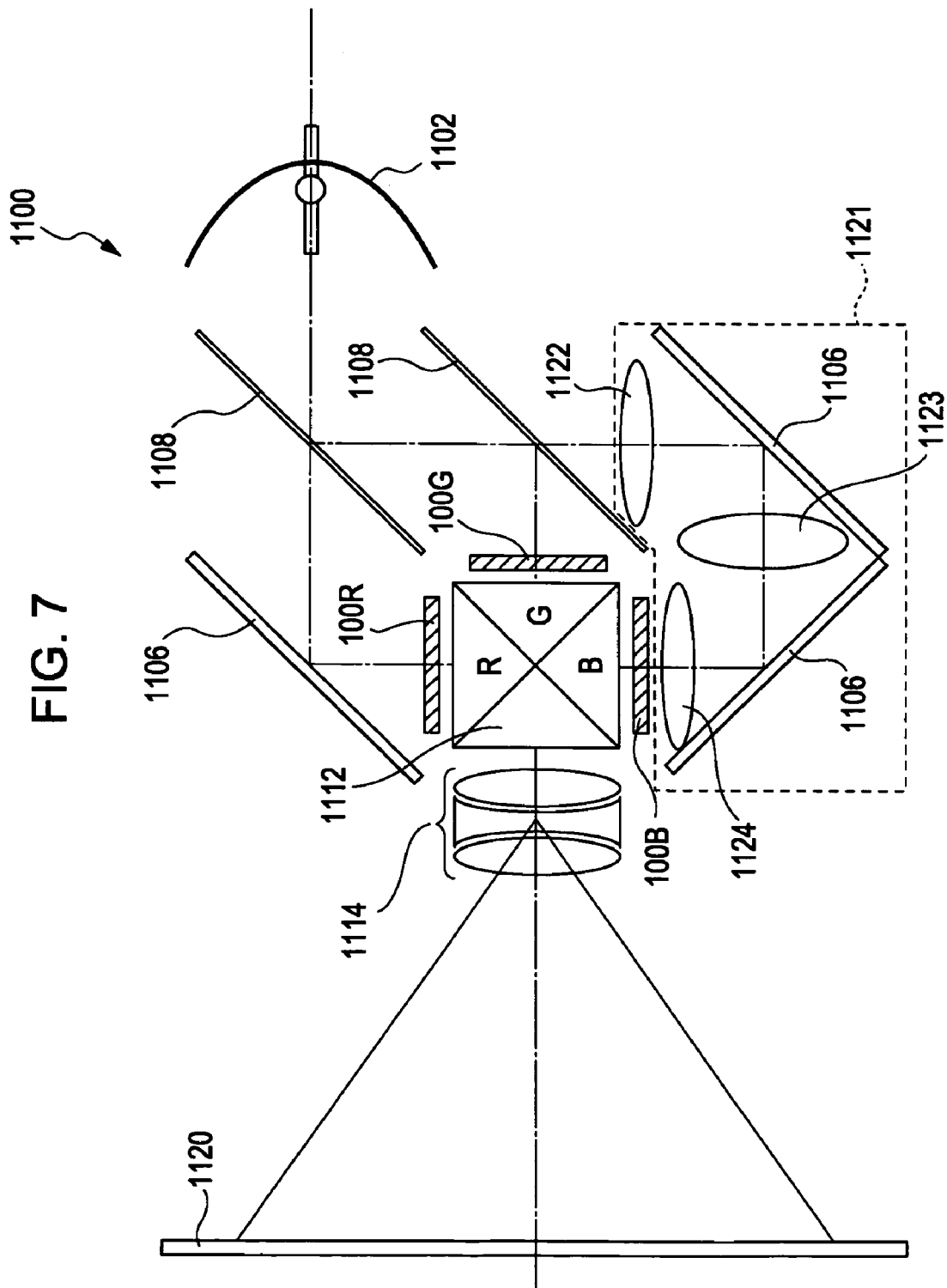
FIG. 7 is an illustration of an example of an electronic apparatus according to a third embodiment of the present invention.

An electronic apparatus according to a third embodiment of the present invention will now be described. The electronic apparatus includes light valves including electro-optical devices. FIG. 7 is an illustration of a liquid crystal projector that is an example of the electronic apparatus.

With reference to FIG. 7, the liquid crystal projector, which may be referred to as a projection-type color display apparatus, is represented by reference numeral 1100 and includes a red light valve 100R, a green light valve 100G, and a blue light valve 100B. The red, green, and blue light valve 100R, 100G, and 100B are liquid crystal modules and include electro-optical devices having the same configuration as that of one of those electro-optical devices described above in detail. These electro-optical devices include TFT substrates and driving circuits disposed thereon. In the liquid crystal projector 1100, light emitted from a lamp unit 1102 including a metal halide lamp serving as a white light source is split into a red light component R, a green light component G, and a blue light component B. The red, green, and blue light components R, G, and B are guided to the red, green, and blue light valve 100R, 100G, and 100B, respectively. In order to prevent the loss of the blue light component B traveling a long distance, the blue light component B is guided to the blue light valve 100B through a relay lens system 1121 including an entrance lens 1122, a relay lens 1123, and an exit lens 1124. The red, green, and blue light components R, G, and B are modulated with the red, green, and blue light valve 100R, 100G, and 100B, respectively, and then synthesized into a light beam with a dichroic prism 1112. The light beam is projected onto a screen 1120 through a projection lens 1114, thereby displaying a color image.

An electro-optical device according to the present invention can be applied to passive matrix-type liquid crystal display panels; active matrix-type liquid crystal display panels including, for example, TFTs and/or TFDs serving as switching elements; and various electro-optical apparatuses such as electroluminescent apparatuses; organic electroluminescent apparatuses; plasma display panels; electrophoretic displays; displays, such as field emission displays and surface-conduction electron-emitter display, using electron emission; and digital light processors (DLPs) or digital micromirror devices (DMDs).

The present invention can be applied to display devices including semiconductor substrates and elements arranged thereon, liquid crystal-on-silicon (LCOS) devices, and the like.

In the LCOS devices, transistors which are included in pixels or circuits and which serve as switching elements are arranged on single-crystalline silicon substrates. The pixels include reflective pixel electrodes and pixel elements are arranged under the pixel electrodes.

What is claimed is:

1. An electro-optical device comprising:
   a substrate;
   a scanning line;
   a data line;
   a switching transistor arranged to correspond to the intersection of the scanning line and the data line, the transistor including a semiconductor layer, the semiconductor layer including a channel region;
   a first metal layer having a face that faces the semiconductor layer;
   a second metal layer, the first metal layer being closer to the semiconductor layer than the second metal layer; and
   an anti-reflective layer arranged on the face of the first metal layer, the anti-reflective layer covering the channel region as viewed in plan view.

2. The electro-optical device according to claim 1, wherein the first metal layer is closer to a light-incident face of the substrate than the semiconductor layer.

3. The electro-optical device according to claim 1, wherein the first metal layer is closer to a face of the substrate that is opposite to the light-incident face than the semiconductor layer.

4. The electro-optical device according to claim 1, further comprising:
   a pixel electrode arranged to correspond to the intersection of the scanning and data line; and
   a storage capacitor arranged above the first metal layer, the storage capacitor holding the voltages of the pixel electrode, the storage capacitor including the second metal layer, a third metal layer, and a dielectric layer disposed between the first and second metal layers, the first metal layer being disposed above the semiconductor layer and being included in the data line.

5. The electro-optical device according to claim 1, further comprising:
   a pixel electrode arranged to correspond to the intersection of the scanning and data line; and
   a storage capacitor arranged above the first metal layer, the storage capacitor holding the voltages of the pixel electrode, the first metal layer being disposed above the semiconductor layer and being included in the data line.

6. The electro-optical device according to claim 1, the first metal layer having a recessed section opposed to the semiconductor layer, the recessed section having a depth less than that of other sections of the first metal layer, the anti-reflective layer being disposed on the recessed section.

7. The electro-optical device according to claim 1, the anti-reflective layer entirely covering the semiconductor layer as viewed in plan view.

8. The electro-optical device according to claim 1, the anti-reflective layer extending over regions other than a contact hole for electrically connecting the semiconductor layer to the first metal layer.

9. The electro-optical device according to claim 1, further comprising an insulating layer disposed between the anti-reflective layers and the first metal layer.

* * * * *